United States Patent Office 3,756,838
Patented Sept. 4, 1973

3,756,838
STRONTIUM FLUORMICA GLASS-CERAMICS
George H. Beall, Big Flats, N.Y., assignor to Corning Glass Works, Corning, N.Y.
Filed May 28, 1971, Ser. No. 148,057
Int. Cl. C03c 3/04, 3/10, 3/22
U.S. Cl. 106—39.6          3 Claims

ABSTRACT OF THE DISCLOSURE

This invention relates to the production of glass-ceramic articles wherein the predominant crystal phase is an essentially alkali metal-free fluormica. Such articles are machinable with normal metal tools and consist essentially, by weight on the oxide basis, of about 3–30% SrO, 10–35% MgO, 5–26% $Al_2O_3$, 30–65% $SiO_2$, and 3–15% F. Certain of these glass-ceramic bodies also exhibit water-swelling even in contact with cold water. These water-swelling fluormica glass-ceramic bodies consist essentially, by weight on the oxide basis, of about 8–30% SrO, 10–35% MgO, 5–26% $Al_2O_3$, 30–60% $SiO_2$, and 3–15% F.

Glass-ceramic articles are produced through the controlled crystallization in situ of glass bodies. Because of this mode of formation, the production of glass-ceramic articles commonly contemplates three general steps. First, a glass-forming batch is compounded which will normally contain a nucleating agent or crystallization-promoting agent. Second, this batch is melted to a homogeneous liquid and the melt thereafter simultaneously cooled and shaped to a glass article of desired dimensions and configuration. Third, the glass article is heat treated according to a specifically-defined, time-temperature schedule such that nuclei are initially developed within the body of the glass which act as sites for the subsequent growth of crystals thereon as the heat treatment proceeds.

Since the crystallization in situ of the original glass body is the result of the essential simultaneous growth of crystals on countless nuclei, the structure of a glass-ceramic article consists of relatively uniformly-sized, fine-grained crystals homogeneously dispersed in a residual glassy matrix, these crystals comprising the predominant proportion of the article. In view of this, glass-ceramic articles are commonly defined as being at least 50% by weight crystalline and, in many instances, are actually greater than 75% by weight crystalline. Because of this very high crystallinity, the chemical and physical properties of glass-ceramic articles are usually materially different from those of the original glass body and will be more closely akin to those exhibited by the crystal phase. Furthermore, the residual glassy matrix will present a widely different composition from that of the parent glass inasmuch as the constituents comprising the crystal phase will have been precipitated therefrom.

The production of a glass-ceramic article through the crystallization in situ of a glass article means that conventional glass forming processes such as blowing, casting, drawing, pressing, rolling, spinning, etc., can normally be utilized in securing the desired dimensions and configuration to the article. Finally, like glass, a glass-ceramic article is non-porous and free from voids.

U.S. Pat. No. 2,920,971, the fundamental patent in the field of glass-ceramic production, provides an extensive discussion of the practical aspects and theoretical considerations involved in the manufacture of such articles, along with an explanation of the crystallization mechanism appertaining. Reference is made to that patent for a more detailed study of these matters.

The micas constitute a family of silicate minerals having a unique two-dimensional or sheet structure. Naturally-occurring micas consist of large crystals which can readily be split into thicknesses of 0.001" or less. Sheet mica, possessing the property of flexibility coupled with high dielectric strength, has been a very important electrical insulating material.

Most naturally-occurring micas are hydroxyl silicates, whereas micas produced synthetically have commonly involved replacing the hydroxyl groups within the structure with fluorine. Extensive research has been pursued in the field of synthetic mica manufacture and those efforts can be classified into five principal areas: (1) attempts to produce single crystals of fluorine mica; (2) hot-pressed fluormica ceramics; (3) glass-bonded fluormica ceramics; (4) fusion cast mica materials; and (5) fluormica glass-ceramics. A summary of this research can be made in the finding that, whereas fine-grained, polycrystalline mica ceramics do not exhibit the single crystal characteristics of flexibility, such products can, however, demonstrate excellent dielectric properties, thermal stability, and mechanical machineability.

The classic crystal structure of fluormica has been determined to be defined within the generalized structural formula $X_{0.5-1}Y_{2-3}Z_4O_{10}F_2$, wherein X represents cations which are relatively large in size, e.g., 1.0–1.6 A. radius, Y embodies somewhat smaller cations, e.g., 0.6–0.9 A. radius, and Z depicts small cations, e.g., 0.3–0.5 A. radius, which coordinate to four oxygens. The X cations are in dodecahedral coordination and the Y cations in octahedral coordination. The fundamental unit of the mica structure is the $Z_2O_5$ hexagonal sheet formed due to the fact that each $ZO_4$ tetrahedron shares three of its corners with others in a plane. As is the situation in naturally-occurring micas so it is in the synthetic fluormicas having the classical micaceous structure, that two $Z_2O_5$ sheets, each having apical oxygens and associated interstitial fluoride ions directed toward each other, are bonded by the Y cations. The mica layer so-formed has been demonstrated to be a 2 to 1 layer since it is composed of two tetrahedral sheets with one octahedral sheet. The mica layers, themselves, are bonded to each other by the relatively large X cations in the so-called interlayer sites. These X cations are commonly potassium but are sometimes such other large alkali metal and alkaline earth metal cations as $Na^+$, $Rb^+$, $Cs^+$, $Ca^{+2}$, $Sr^{+2}$, and $Ba^{+2}$.

In United States application Ser. No. 53,121, now Pat. No. 3,689,293 filed July 8, 1970 by the present inventor, there is described the production of mechanically machineable fluormica glass-ceramic articles through the crystallization in situ of opal glasses consisting essentially, by weight on the oxide basis, of about 25–60% $SiO_2$, 15–35% $R_2O_3$, wherein $R_2O_3$ consists of 3–15% $B_2O_3$ and 5–25% $Al_2O_3$, 2–20% $R_2O$, wherein $R_2O$ consists of 0–15% $Na_2O$, 0–15% $K_2O$, 0–15% $Rb_2O$, and 0–20% $Cs_2O$, 4–25% MgO+0–7% $Li_2O$, wherein the total of MgO+$Li_2O$ consists of 6–25%, and 4–20% F. In those micas the X, Y, and Z positions were filled according to the following manner: X position—K, Na, Rb, Cs; Y position—Mg, Al, Li; Z position—Al, B, Si.

The basic mica structure of those products, as identified through X-ray diffraction analyses, consisted of a fluorophlogopite solid solution. This fluorophlogopite solid solution was deemed to fall within three components: normal fluorophlogopite $KMg_3AlSi_3O_{10}F_2$, boron fluorophlogopite, $KMg_3BSi_3O_{10}F_2$, and a subpotassic aluminous phlogopite whose exact composition was unknown but which was thought to approximate $$K_{0.5}Mg_2Al_{0.83}BSi_3O_{10}(F_2).$$

In addition, it was believed that considerable solid solution existed between those phlogopite species and the lithia fluormicas, e.g., polylithionite, $KLi_2AlSi_4O_{10}F_2$. To secure mechanical machinability to the alkali metal trisilicic products of that invention, $B_2O_3$ was a required constituent.

In United States application Ser. No. 117,933, filed Feb. 24, 1971 by David G. Grossman, there is described tetrasilicic fluormica glass-ceramic articles exhibiting good mechanical machineability resulting from the controlled crystallization in situ of transparent-to-opal glasses consisting essentially, by weight on the oxide basis, of about 45–70% $SiO_2$, 8–20% MgO, 8–15% $MgF_2$, and 5–35% $R_2O+RO$, wherein $R_2O$ ranges between about 5–25% and consists of at least one oxide in the indicated proportion selected from the group 0–20% $K_2O$, 0–23% $Rb_2O$, and 0–25% $Cs_2O$, and RO ranges between about 0–20% SrO and/or BaO and/or CdO. In those micas, the X, Y, and Z positions were filled in the following manner: X position—K, Rb, Cs, Sr, Ba, or Cd as available; Y position—Mg only; and Z position—Si only.

Those micas, having the hypothesized formula $$KMg_{2.5}Si_4O_{10}F_2,$$

have been denoted as tetrasilicic inasmuch as there are no Al- or B-for-Si substitutions in the $Z_2O_5$ hexagonal sheets of the mica layer such as are found in the normal fluorophlogopites, $KMg_3AlSi_3O_{10}F_2$, and boron fluorophlogopites, $KMg_3BSi_3O_{10}F_2$. Therefore, although the fundamental mica structure of those glass-ceramic articles, as identified through X-ray diffraction, is of the phlogopite type, exhibiting a diffraction pattern closely resembling that of boron fluorophlogopite, the tetrahedral sheets are comprised exclusively of $SiO_4$ tetrahedra, there normally being no other cations present in the glass composition which are small enough to occupy the four-coordinated Z position. Because of that feature, the glass-ceramic articles of that invention are related to prior art fluormica glass-ceramics in containing synthetic fluormica crystals, but are readily distinguishable therefrom in not containing trivalent cations such as $Al^{+3}$ and $B^{+3}$ as necessary crystal components.

The present invention is founded upon the discovery that glass-ceramic articles consisting essentially of non-alkali metal-containing fluormica crystals dispersed in a minor amount of residual glass can be produced through the crystallization in situ of relatively stable, transparent-to-translucent glass bodies consisting essentially, by weight on the oxide basis, of about 30–65% $SiO_2$, 5–26% $Al_2O_3$, 10–35% MgO, 3–30% RO, wherein RO consists of 3–30% SrO and 0–25% BaO, and 3–15% F. Up to several percent individually of the following compatible metal oxides may be tolerated in the base glass composition but the total of all such additions should not exceed about 10% by weight: $B_2O_3$, CaO, PbO, $As_2O_3$, $Sb_2O_3$, $P_2O_5$, $SnO_2$, $ZrO_2$, $TiO_2$, ZnO, $Fe_2O_3$, MnO, BeO, and $La_2O_3$. Such additions can, in some instances, be useful for controlling the melting and forming character of the original glass or in modifying the physical properties of the parent glass and the final crystalline product. The heavy alkali metals, e.g., K, Rb, and Cs, will, of course, substitute for the alkaline earth metals Sr and Ba, but their presence destroys the unique properties associated with these substantially alkali-free fluormica materials.

To achieve a high degree of fluormica crystallization, the glass composition is designed to approximate the possible mica solid solutions. Hence, the alkaline earth compositions of the present products normally range between the end members $RMg_{2.5}(AlSi_3O_{10})F_2$ and $$R_{0.5}Mg(AlSi_3O_{10})F_2,$$

wherein R is a combination of the heavy alkaline earths Sr and Ba. There is very little, if any, solid solution between these trisilicic micas and the tetrasilicic or disilicic mica formulas, i.e., the cation ratio Al/Si is commonly close to ⅓. Another vital feature in the instant invention is the discovery that SrO is demanded to stabilize the alkaline earth metal fluormica glass-ceramic formation. It is well-known in the literature dealing with the chemistry of micas formed upon cooling from a melt that Ba and K are the most stable ions in the twelve-fold coordinated position in the mica structure. Barium would, consequently, readily substitute for strontium in the formation of these mica bodies. Nevertheless, the presence of strontium in the initial batch is necessary to stabilize glass formation. Thus, the complete substitution of barium for strontium cannot be undertaken since devitrification of the glass will occur as the melt is being cooled.

In summary, the instant invention involves the production of very highly crystalline, synthetic, substantially alkali-free, trisilicic fluormica glass-ceramic articles which are mechanically machineable without the required presence of $B_2O_3$.

In the broadest terms, the instant invention comprises melting a batch for a glass consisting essentially, by weight on the oxide basis, of about 30–65% $SiO_2$, 5–26% $Al_2O_3$, 10–35% MgO, 3–30% RO, wherein RO consists of 3–30% SrO and 0–25% BaO, and 3–15% F, simultaneously cooling the melt at least below the transformation range thereof and shaping a glass article therefrom, and thereafter heating this glass article to a temperature between about 800°–1200° C. for a period of time sufficient to secure the desired crystallization in situ. (The transformation range has been defined as the temperature at which a liquid melt is deemed to have been transformed into an amorphous solid; that temperature commonly being considered as lying between the strain point and annealing point of a glass.) Inasmuch as crystallization in situ is a process which is both time and temperature dependent, it will be appreciated that brief dwell periods only will be required where temperatures within the hotter extreme of the crystallization range are employed, e.g., ½ hour or less; whereas, at temperatures approaching the cooler extreme of the heat treating range, dwell periods of up to 24–48 hours may be necessary to achieve high crystallinity.

The preferred heat treatment practice contemplates a two step schedule. The glass article is initially heated to a temperature somewhat above the transformation range thereof, e.g., about 700°–800° C., and maintained within that temperature field for a sufficient period of time to insure good nucleation and initiate incipient crystal development. Subsequently, the so-nucleated article is raised to a temperature between about 1050–1200° C. and held within that temperature range for a sufficient length of time to complete substantial crystal growth. A nucleation period of about 1–6 hours followed by a crystallization growth period of about 1–8 hours have been determined very satisfactory.

It can readily be understood that numerous variations in the process for crystallizing the glass articles are possible. As one example thereof, after the batch has been melted and this melt quenched to a temperature below the transformation range and a glass article shaped therefrom, that glass article may optionally be cooled to room temperature to allow visual inspection of the glass quality prior to commencing the heat treatment schedule. On the other hand, however, where speed in production and fuel economies are desired, the above melt may merely be cooled to a glass article at some temperature just below the transformation range and the crystallization in situ started immediately thereafter.

Furthermore, whereas a two-step heat treatment schedule is much preferred, a reasonably well-crystallized article can be obtained when the parent glass article is simply heated from room temperature or the transformation range to temperatures within the 800°–1200° C. field and maintained therein for a sufficient period of time to develop the high crystallinity desired. Also, it should be apparent that no single dwell temperature is required to attain satisfactory crystallization. Instead, the treating temperature can be varied at will within the crystallization range.

In yet another embodiment, no dwell period per se at any specific temperature is mandatory. Thus, where the rate of heating the glass article above the transformation range is relatively slow and the final crystallization temperature utilized relatively high, no definite hold period at any one temperature is necessary.

In any event, since the growth of crystals is a function of both time and temperature, the rate at which the glass article is heated above the transformation range must not be so rapid that a growth of sufficient crystals to support the article will not have time to take place and the article will, therefore, deform and slump. Consequently, although heating rates of 10° C. per minute and higher have been successfully employed, especially where some physical support for the glass bodies has been provided to minimize the deformation thereof, the preferred practice utilizes heating rates of 3°–5° C. per minute. These heating rates have resulted in articles exhibiting very little, if any, deformation throughout the entire composition field operable in this invention.

The present invention will be further understood by reference to the following detailed description thereof and the appended drawings wherein.

Figure 1:
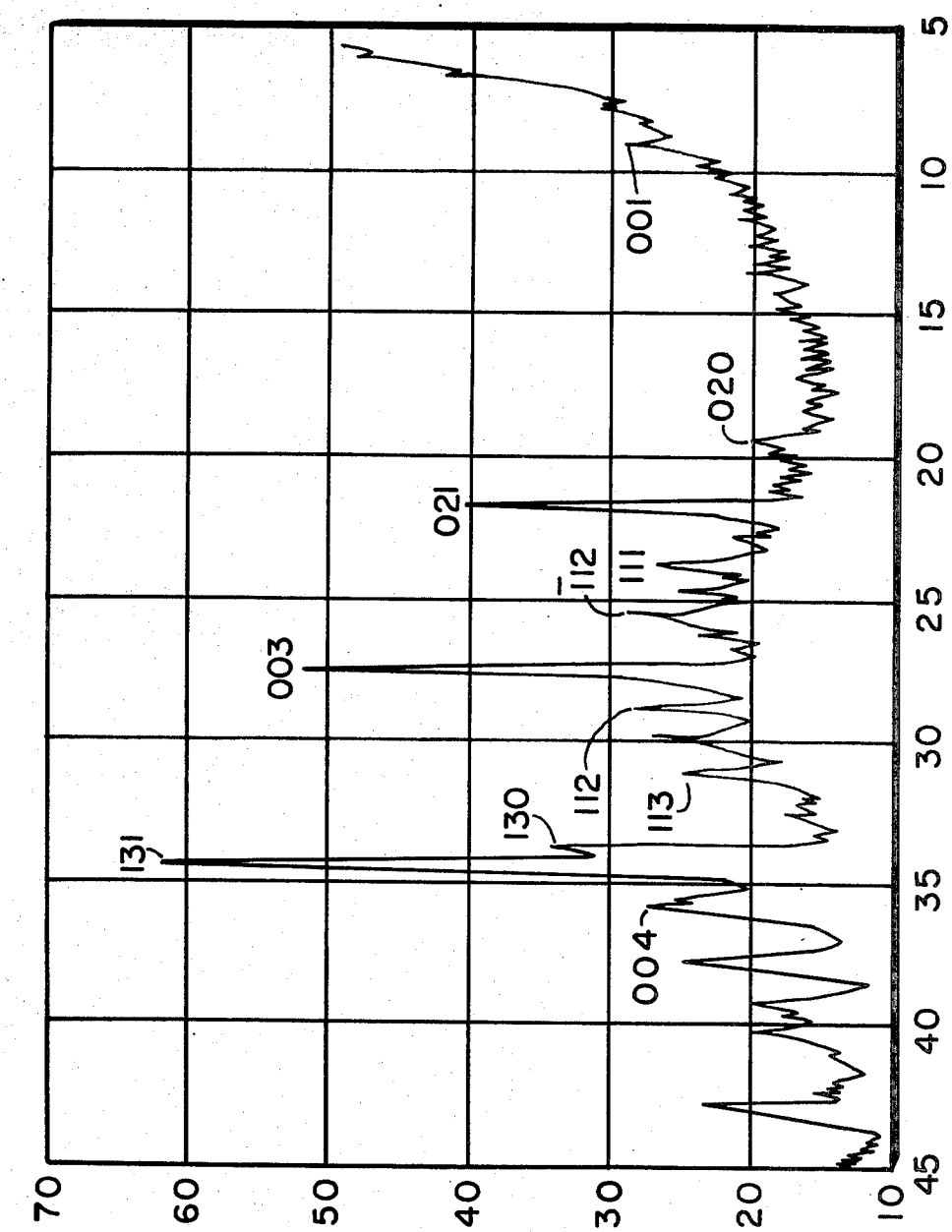
FIG. 1 is an X-ray diffraction pattern typically exhibited by the crystallized products of the invention.

Table I lists compositions, expressed in weight percent on the oxide basis, of thermally crystallizable glasses which, when subjected to the heat treatment procedure of this invention, were crystallized in situ to relatively uniformly, highly crystalline glass-ceramic articles. The ingredients constituting the glass batches can be any materials, either oxides or other compounds, which, upon being melted together, are converted to the desired oxide compositions in the proper proportions. The batch ingredients were compounded, ballmilled together to aid in securing a homogeneous melt, and thereafter melted in closed platinum crucibles for about 4–6 hours in an electrically-fired furnace operating at 1450°–1500° C. The melts were poured into steel molds to form patties about 7″ square and ½″–1″ in thickness. These glass patties were immediately transferred to an annealer operating at about 600°–650° C. The final glass bodies were normally clear although in some instances a slight haze was observed.

Since it is not known with which cations the fluoride is combined, it is merely reported as fluoride in accordance with conventional glass analytical practice. The volatilization of fluoride from these glasses was relatively low, i.e., about 15–20% by weight, as is illustrated in the analyzed values for fluoride recorded in Examples 2 and 4.

Typical batch materials employed for these glasses were:

- Sand
- T-61 alumina
- Calcined magnesite
- Magnesium fluoride
- Strontium carbonate
- Barium carbonate The viscosity of the glasses at the liquidi thereof ranged between about 30–300 poises with liquidus temperature ranging between about 1150°–1300° C. determined on individual examples.

TABLE 1

| | Percent | | | | | | | |
|---|---|---|---|---|---|---|---|---|
| | 1 | 2 | 3 | 4 | 5 | 6 | 7 | 8 |
| $SiO_2$ | 35.0 | 40.7 | 37.8 | 35.0 | 36.4 | 44.4 | 38.9 | 41.6 |
| $Al_2O_3$ | 16.2 | 11.4 | 13.8 | 13.3 | 13.3 | 11.4 | 13.2 | 11.8 |
| MgO | 20.8 | 27.0 | 23.8 | 21.8 | 22.9 | 27.6 | 22.9 | 27.4 |
| SrO | 19.4 | 11.6 | 15.7 | 21.3 | 7.6 | 6.8 | 6.1 | 7.0 |
| F | 8.6 | 9.3 | 8.9 | 8.6 | 8.6 | 8.6 | 9.1 | 9.5 |
| BaO | | | | | 11.2 | | 9.8 | |
| CaO | | | | | | | | 2.7 |
| F (Anal.) | | 7.7 | | 7.1 | | | | |

| | Percent | | | | | | |
|---|---|---|---|---|---|---|---|
| | 9 | 10 | 11 | 12 | 13 | 14 | 15 |
| $SiO_2$ | 40.2 | 36.5 | 34.4 | 33.1 | 35.9 | 39.3 | 35.9 |
| $Al_2O_3$ | 11.5 | 10.3 | 12.8 | 12.3 | 13.4 | 11.0 | 13.4 |
| MgO | 24.8 | 22.2 | 21.1 | 20.2 | 21.9 | 26.1 | 23.3 |
| SrO | 10.2 | 15.6 | 16.4 | 7.9 | 17.2 | 4.2 | 6.3 |
| F | 9.4 | 8.3 | 9.2 | 8.9 | 9.7 | 9.1 | 9.3 |
| BaO | | | 6.1 | 17.6 | | 10.3 | 10.0 |
| CaO | 3.9 | | | | | | |
| $ZrO_2$ | | 7.1 | | | | | |
| $K_2O$ | | | | | 1.9 | | |
| $B_2O_3$ | | | | | | | 1.8 |

| | Percent | | | | | | | |
|---|---|---|---|---|---|---|---|---|
| | 16 | 17 | 18 | 19 | 20 | 21 | 22 | 23 |
| $SiO_2$ | 38.8 | 44.5 | 48.1 | 31.6 | 37.1 | 36.5 | 37.5 | 38.2 |
| $Al_2O_3$ | 16.7 | 9.1 | 7.1 | 23.0 | 13.5 | 10.0 | 14.0 | 13.6 |
| MgO | 17.5 | 26.6 | 27.9 | 14.8 | 23.3 | 19.5 | 23.1 | 23.5 |
| SrO | 21.9 | 9.1 | 7.2 | 21.6 | 11.5 | 10.1 | 6.5 | 6.3 |
| F | 5.1 | 10.7 | 9.7 | 9.0 | 8.8 | 9.0 | 8.5 | 8.4 |
| BaO | | | | | 5.8 | 14.9 | 10.4 | 10.0 |

After annealing and visual inspection of glass quality, the patties were transferred to an electrically-fired furnace and exposed to the heat treatment schedules recited in Table II. Upon completion of the heat treatment schedule, the electric current to the furnace was cut off and the crystallized articles left in the furnace to cool to room temperature. This practice, denominated as "cooling at furnace rate," was used to insure that the thick-walled patties would not crack or fracture from thermal shock. Thus, the coefficient of thermal expansion over the range of 0°–500° C. averages between about $80-100 \times 10^{-7}$/° C. Therefore, whereas small, thin-walled articles can be removed directly from the heat treating kiln into the ambient atmosphere without breakage, to do so with the thick-walled patties was believed to unnecessarily hazard the cracking and fracture thereof. The rate of "cooling at furnace rate" has been estimated to approximate 3°–5° C./minute. In each of the reported schedules, the temperature within the furnace was raised at a rate averaging about 5° C./minute to the dwell temperature.

Table II further records a visual description of the crystallized body, the crystal phases present therein as identified through X-ray diffraction analyses, and a qualitative measure of machineability of each crystallized article on an arbitrary scale wherein brass is given a value of 15, aluminum a value of 32, and cold-rolled steel a value of 78. The mechanical strengths of the crystallized articles have been measured in terms of modulus of rupture values between about 12,000–20,000 p.s.i. This reasonably good strength is believed indicative of the high percentage of crystallinity in the products. The fluormica solid solution crystals comprise the vast bulk of the crystallization. The secondary phases, when present, total no more than about 15%. Measurements of dielectric constant at 25° C., 1 kc.; dielectric loss tangent at 25° C., 1 kc.; log electrical resistivity at 500° C. ohm-cm.; and a qualitative measure of the water-swelling behavior are also tabulated where determined on individual examples.

TABLE II

| Example No. | Heat treatment | Visual description | Crystal phases | Machineability | Dielectric constant | Loss tangent | Resistivity | Water swelling behavior |
|---|---|---|---|---|---|---|---|---|
| 1 | 800° C. for 4 hrs. 1,050° C. for 6 hrs. | Cherty fracture, cream, opaque. | Fluormica s.s, Sr-aluminosilicate. | 40 | | | | Rapidly disintegrates. |
| 2 | 800° C. for 4 hrs. 1,100° C. for 6 hrs. | do | Fluormica s.s., Sellaite. | 20 | 7.11 | 0.00015 | 10.5 | Do. |
| 3 | 800° C. for 4 hrs. 1,100° C. for 6 hrs. | Cherty fracture, cream, slightly translucent. | Fluormica s.s., | 40 | | | | Do. |
| 4 | 800° C. for 4 hrs. 1,150° C. for 6 hrs. | Fine-grained fracture, cream, opaque. | Fluormica s.s., Sellaite, Sr-aluminosilicate. | 20 | | | | Very rapidly disintegrates. |
| 5 | 800° C. for 4 hrs. 1,100° C. for 6 hrs. | Cherty facture, cream, opaque. | Fluormica s.s. | 20 | 7.35 | 0.0004 | 10.2 | None. |
| 6 | 800° C. for 4 hrs. 1,100° C. for 6 hrs. | do | Fluormica s.s., Sellaite, Cordierite. | 50 | | | | Do. |
| 7 | 800° C. for 4 hrs. 1,140° C. for 6 hrs. | Cherry fracture, | Fluormica s.s., Sellaite. | 20 | | | | Do. |
| 8 | 800° C. for 4 hrs. 1,100° C. for 6 hrs. | Fine-grained fracture, cream, opaque. | do | 20 | | | | Do. |
| 9 | 800° C. for 4 hrs. 1,100° C. for 6 hrs. | do | do | 20 | | | | Disintegrates. |
| 10 | 800° C. for 4 hrs. 1,100° C. for 6 hrs. | do | Fluormica s.s., Cubic zirconia. | 20 | | | | Do. |
| 11 | 800° C. for 4 hrs. 1,150° C. for 6 hrs. | do | Fluormica s.s. | 20 | | | | None. |
| 12 | 800° C. for 4 hrs. 1,150° C. for 6 hrs. | do | Fluormica s.s., Sellaite. | 20 | | | | Do. |
| 13 | 800° C. for 4 hrs. 1,100° C. for 6 hrs. | do | Fluormica s.s. | 40 | | | | Do. |
| 14 | 725° C. for 4 hrs. 1,150° C. for 6 hrs. | Cherty fracture, cream, opaque. | Fluormica s.s., Sellaite. | 40 | | | | Do. |
| 15 | 725° C. for 4 hrs. 1,150° C. for 6 hrs. | do | do | 20 | | | | Do. |
| 16 | 800° C. for 4 hrs. 1,050° C. for 6 hrs. | Cherty fracture, buff, opaque. | Fluormica s.s., Sr-aluminosilicate. | 40 | | | | Disintegrates. |
| 17 | 800° C. for 4 hrs. 1,100° C. for 6 hrs. | Cherty fracture, cream, opaque. | Fluormica s.s., Sellaite. | 30 | | | | Do. |
| 18 | 800° C. for 4 hrs. 1,100° C. for 6 hrs. | do | do | 30 | | | | None. |
| 19 | 800° C. for 4 hrs. 1,100° C. for 6 hrs. | do | Fluormica s.s., Sr-aluminosilicate. | 40 | | | | Disintegrates. |
| 20 | 800° C. for 4 hrs. 1,100° C. for 6 hrs. | do | Fluormica s.s. | 30 | 7.30 | 0.0004 | 10.3 | None. |
| 21 | 800° C. for 4 hrs. 1,100° C. for 6 hrs. | Cherty fracture, white, opaque. | do | 30 | 7.54 | 0.0036 | 9.4 | Do. |
| 22 | 800° C. for 4 hrs. 1,100° C. for 6 hrs. | Cherty fracture, cream, opaque. | do | 40 | 6.67 | 0.0004 | 10.4 | Do. |
| 23 | 800° C. for 4 hrs. 1,110° C. for 6 hrs. | do | do | 30 | 6.57 | 0.0004 | 10.6 | Do. |

The crystallization process is comprised of two steps: (1) fluoride-containing crystals (probably magnesium fluoride—sellaite) first develop at temperatures between about 700°–800° C.; and then (2) disordered fine-grained fluormica crystals grow upon these nuclei upon further heating of the body at temperatures between about 800°–1000° C. The disordered fluormica pattern is typified by the presence of only a few of the common fluormica peaks in the X-ray diffraction patterns. Upon very long or higher temperature heat treatments, e.g., 1050°–1200° C., this disordering will usually disappear. The resulting X-ray diffraction trace portrays the normal complex fluormica-type pattern, as is depicted in FIG. 1, representing the crystalline product of Example 2. Bodies demonstrating better machineability have resulted where the disordered fluormica X-ray diffraction pattern is absent. Therefore, the preferred heat treating practice of the invention contemplates crystallization temperatures between about 1050°–1200° C.

Figure 2:
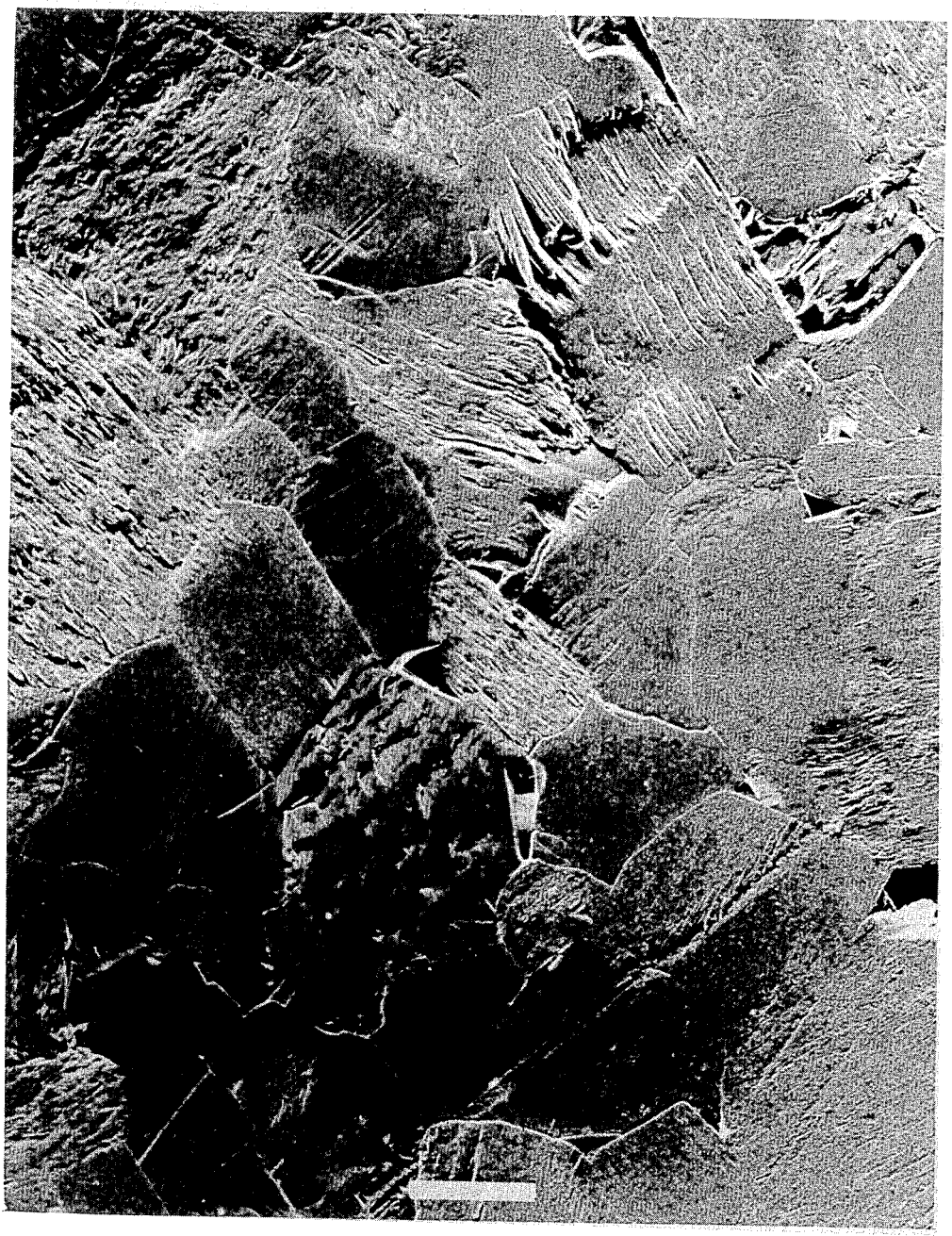
FIG. 2 is a replica electron micrograph illustrating the typical crystalline microstructure of the glass-ceramic of the invention.

The microstructure of the crystallized articles is commonly a highly crystalline, blocky arrangement wherein the individual fluormica crystals exhibit a very low aspect ratio. FIG. 2 is a replica electron micrograph taken of the product of Example 7 which clearly illustrates this type of microstructure. (The white bar at the base of the micrograph represents 1 micron.) FIG. 2 also indicates the very high crystallinity of these products, i.e., normally greater than 66⅔% by volume, as well as the low crystalline aspect ratio. The body shown in FIG. 2 is greater than about 90% crystalline.

Inasmuch as the products of the invention are essentially free from the alkali metals, the dielectric properties thereof are excellent. For example, loss tangents at frequencies of 1 mh. can be less than 0.0001 up to temperatures of 200° C. Log resistivities are normally high, ranging between about $10^9$–$10^{12}$ ohm-cm. at 500° C. The dielectric constant will typically range about 7 over a broad band of frequencies.

A further valuable property displayed by these articles is high refractoriness. Thus, many of these products can withstand long exposures to soaking heats of 1000°–1100° C. with essentially no physical deformation. Example 12 shows no noticeable deformation after several hours as temperatures up to 1200° C.

Inasmuch as these desired properties are, in general, founded upon the presence of high crystallinity, the preferred compositions are those which insure very high crystallinity, i.e., normally greater than at least 75% by volume. From that point of view, glasses consisting esesntially, by weight on the oxide basis, of about 35–50% $SiO_2$, 9–18% $Al_2O_3$, 5–25% SrO, 16–29% Mgo, and 4–12% F.

As has been explained above, certain of these essentially alkali-free, fluormica glass-ceramic bodies will swell upon contact with water, even cold water. Such bodies fall within the general composition area of 30–60% $SiO_2$, 5–26% $Al_2O_3$, 10–35% MgO, 8–30% SrO, and 3–15% F by weight. Significant additions of oxides such as $K_2O$ and BaO, which are normally considered stable mica modifiers, tend to have an inhibiting effect upon this phenomenon. Thus, as little as 5% BaO or 2% $K_2O$ will normally prevent water swelling at least within a reasonable time. Likewise, CaO should not be included in amounts more than about 5% where this phenomenon is desired.

The water swelling may produce some surface compression in the glass-ceramic articles but, more likely, the stresses resulting from the swelling cannot be accommodated and disintegration of the article occurs. Hence, when a piece of the glass-ceramic is placed in water, it will spontaneously disintegrate in a matter of several minutes, hours, or days to produce a finely-divided slurry of water-swelled fluormica particles. These fine particles, according to general mineralogical classifications, fall into the clay group. Thus, the water-swelled fluormica appears to give the typical clay-like X-ray diffraction patterns indicating swelling parallel to the fluormica c-axis which is probably caused by the incorporation of such large hydrous species as $H_2O$ and, perhaps, $H_3O^+$ parallel to 001. Large organic molecular species such as ethylene glycol can also cause a similar swelling in certain compositions.

Figure 3:
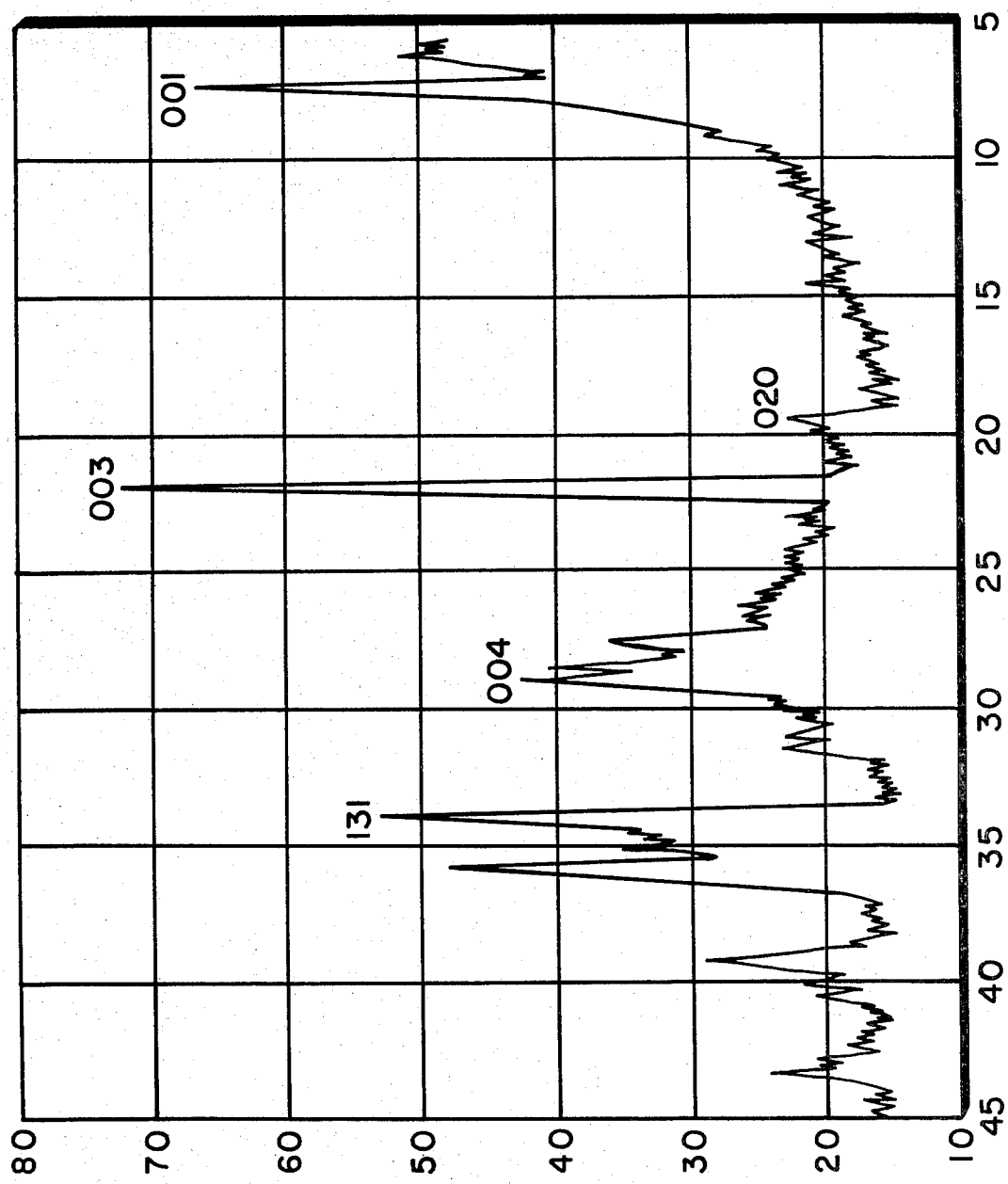
FIG. 3 is an X-ray diffraction pattern typically exhibited by the water-swellable type fluormica glass-ceramics of the invention after contact with water.

FIG. 3 is an X-ray diffraction pattern of the fluorine-containing clay produced through immersion in water for three hours to promote the water swelling and consequent disintegration of the crystallized product of Example 2. The general swelling, as observed from the X-ray diffraction peak shifts, is on the order of 30%. Hence, the 001 spacing is most strontium micas is about 9.5 A.; after water swelling this spacing is increased to about 12.5 A. (compare FIGS. 1 and 3). Therefore, it is surely not surprising that such large scale exapnsion causes disintegration of the article.

Figure 4A:
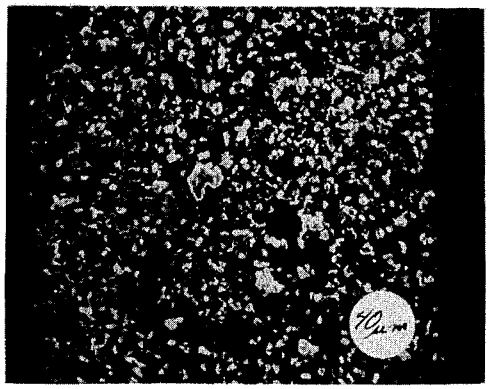
FIG. 4A is a scanning electron micrograph of the finely-divided product resulting from the water swelling and subsequent disintegration of the fluormica glass-ceramics of the invention.
Figure 4B:
FIG. 4B is a scanning electron micrograph of an agglomerated fragment of the finely-divided product depicted in FIG. 4A.

The fluoride-containing clays (termed fluoro-montmorillonoids) resulting from the water swelling and subsequent disintegration of the strontium fluormica glass-ceramic articles of the instant invention are quite uniform in particle distribution. FIG. 4A is a scanning electron micrograph illustrating the clay formed from Example 2 with the typical platlet morphology. (The white circle in the lower right corner of the micrograph represents 40 microns.) FIG. 4B is a scanning electron micrograph taken at a higher magnification of an agglomerated fragment of the clay depicted in FIG. 4A. (The white circle on the lower right corner of the micrograph represents 4 microns.) A particle size distribution determination undertaken on this particlular clay showed about 50% between 2-4 microns. This is approximately the size of the fluormica crystals in the glass-ceramic article. Therefore, by altering the glass composition and the heat treatment schedules, the water-swelled clay particles can be tailored to particle sizes with a very narrow range size distribution. Hence, this invention provides a unique technique for forming clay particles of distinct and uniform size distributions without the conventional grinding and sieving practice. Whereas Example 4 will disintegrate to a fine powder after only 3-4 minutes immersion in water, normally several hours at least will be required (Examples 1-3). From a practical point of view, immersion times longer than about 3 days have arbitrarily been deemed unfeasible. These clays are also interesting in their high refractoriness. Thus, firing to temperatures of 900° C. and higher has not caused a breakdown in the sheet silicate structure.

The expansion of the fluormica particles by the inclusion therein of water molecules and, perhaps, $H_3O^+$ can be destroyed by a simple heating of the clay. At temperatures around 200° C., contraction occurs as the aqueous species are driven off. The X-ray diffraction pattern of these heated materials reverts back to the normal fluormica spectrum with a basal spacing of 9.5 A. As was observed above, this material can withstand temperatures of 900° C. for several hours without any significant further change. However, if the fine particles are heated in air to the original top crystallization temperature, e.g., 1050°-1200° C., there is a breakdown thereof to non-micaceous phases, presumably because of fluorine volatilization from the high-surface-area powder. Such volatilization can be inhibited by conducting this firing in an inert or very dry atmosphere.

It has been learned that prior exposure of the potentially water-swellable glass-ceramic bodies of the present invention to ionic solutions has the effect of slowing or completely preventing subsequent water swelling. For example, Example 4, after being immersed for several hours in a concentrated solution of $NH_4Cl$ will not water swell after subsequent washing, even when the sample is broken in two so as to expose the interior thereof to the water. Similarly, Examples 1, 2 and 4 will not water swell after being first submerged in HCl and $NH_4OH$ solutions. It is assumed that this fortification against water swelling is the result of ion exchange taking place at room temperature. Thus, it appears that when the glass-ceramic articles are contacted with ionic aqueous solutions, certain strontium ions in the articles become very mobile and exchange rapidly with cations in the aqueous solution. For example, significant concentrations of cuprous, cupric, silver, ammonium, sodium, and potassium ions can be built up in these strontium fluormica glass-ceramic articles at room temperature. A high mobility of these strontium ions is not apparent in a dry environment, however. This becomes obvious when the glass-ceramic article is tested for electrical resistivity. The electrical resistivities of these products, when dry, are actually very high, as is evidenced from Example 2.

Practical applications for water-swelling glass-ceramic articles and the resulting fluorine-containing clays include molecular and ion separations materials, water soluble molds, casts, and preformed cores, ceramic masks, and fillers for paints. Cold seal applications are also possible. For example, machined fasteners such as screws can be fashioned and then wetted and locked into a nut. The subsequent water swelling along the contact cements the seal. The fastener can thereafter be fortified against further water swelling by treatment with an aqueous salt solution.

I claim:

1. An essentially alkali metal-free glass-ceramic article exhibiting excellent dielectric properties, a modulus of rupture in excess of 12,000 p.s.i., and good machineability consisting essentially of relatively uniformly-sized, fine-grained fluormica solid solution crystals having a blocky-type microstructure homogeneously dispersed in a glassy matrix, said crystals constituting at least 66⅔% by volume of the article and being formed through the crystallization in situ of a glass body consisting essentially, by weight on the oxide basis, of about 3-30% SrO, 10-35% MgO, 5-26% $Al_2O_3$, 30-65% $SiO_2$, and 3-15% F.

2. A glass-ceramic article according to claim 1 wherein said glass body consists essentially, by weight on the oxide basis, of about 5-25% SrO, 16-29% MgO, 9-18% $Al_2O_3$, 35-50% $SiO_2$, and 4-12% F.

3. A glass-ceramic article according to claim 1 which also exhibits water swelling wherein said glass body consists essentially, by weight on the oxide basis, of about 8-30% SrO, 10-35% MgO, 5-26 $Al_2O_3$, 30-60% $SiO_2$, and 3-15% F.

References Cited
UNITED STATES PATENTS

| | | | |
|---|---|---|---|
| 2,675,853 | 4/1954 | Hatch et al. | 106—39 DV |
| 3,149,947 | 9/1964 | Eppler et al. | 106—39 DV |
| 3,325,265 | 6/1967 | Stookey | 106—39 DV |

ALLEN B. CURTIS, Primary Examiner

M. L. BELL, Assistant Examiner

U.S. Cl. X.R.

106—52